United States Patent
Liao et al.

(10) Patent No.: US 10,069,894 B2
(45) Date of Patent: Sep. 4, 2018

(54) ELECTRONIC DEVICE, STORAGE MEDIUM AND FILE TRANSFERRING METHOD

(71) Applicant: TENCENT TECHNOLOGY (SHENZHEN) COMPANY LIMITED, Shenzhen (CN)

(72) Inventors: Zhi Liao, Shenzhen (CN); Hai Zhen Liao, Shenzhen (CN); Yuan Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 427 days.

(21) Appl. No.: 14/597,696

(22) Filed: Jan. 15, 2015

(65) Prior Publication Data

US 2015/0127773 A1 May 7, 2015

Related U.S. Application Data

(63) Continuation of application No. PCT/CN2014/076010, filed on Apr. 23, 2014.

(30) Foreign Application Priority Data

May 20, 2013 (CN) .......................... 2013 1 0187948

(51) Int. Cl.
   H04L 29/08 (2006.01)
   H04L 12/26 (2006.01)

(52) U.S. Cl.
   CPC .......... *H04L 67/06* (2013.01); *H04L 43/0852* (2013.01)

(58) Field of Classification Search
   CPC .................................................... H04L 67/06
   (Continued)

(56) References Cited

U.S. PATENT DOCUMENTS 4,764,862 A * 8/1988 Barlow .................. G06F 11/00
                                                             709/253
4,972,504 A * 11/1990 Daniel, Jr. ........... G06Q 20/387
                                                             455/2.01

(Continued)

FOREIGN PATENT DOCUMENTS

CN   101009641 A   8/2007
CN   101136791 A   3/2008
(Continued)

OTHER PUBLICATIONS

Apple Inc., "HTTP Live Streaming Overview", 2016.*
(Continued)

*Primary Examiner* — O. C. Vostal
(74) *Attorney, Agent, or Firm* — Anova Law Group, PLLC

(57) ABSTRACT

The present invention discloses an electronic device, a storage medium and a method for transferring a file. The method for transferring the file includes: submitting a file segment to be transferred to a target device to a transferring queue in a main process; waiting for an interrupt signal; monitoring whether the main process produces upload traffic during a preset time period, and if the main process does not produce the upload traffic during the preset time period, sending out an interrupt request which comprises information that the main process does not produce the upload traffic during the preset time period; stopping waiting for the interrupt signal when a response from the target device or the interrupt request are received.

21 Claims, 14 Drawing Sheets

(58) Field of Classification Search
USPC .......................................................... 709/217
See application file for complete search history.

(56) References Cited

U.S. PATENT DOCUMENTS

| | | | | |
|---|---|---|---|---|
| 6,105,145 | A * | 8/2000 | Morgan | G06F 1/08 713/501 |
| 6,760,416 | B1 * | 7/2004 | Banks | H04L 29/1216 379/106.08 |
| 6,772,200 | B1 * | 8/2004 | Bakshi | G06F 17/30905 707/E17.121 |
| 6,938,079 | B1 * | 8/2005 | Anderson | G06F 9/44505 709/217 |
| 7,143,159 | B1 * | 11/2006 | Grace | H04L 41/0213 709/224 |
| 7,698,392 | B2 * | 4/2010 | Zapata | G06F 8/65 709/220 |
| 7,734,724 | B2 * | 6/2010 | Rezvani | G06F 17/3089 709/216 |
| 7,917,647 | B2 * | 3/2011 | Cooper | H04L 41/046 370/229 |
| 8,082,323 | B2 * | 12/2011 | Yamaguchi | G06F 21/31 358/1.15 |
| 8,099,502 | B2 * | 1/2012 | Genske | G06F 9/4411 709/217 |
| 8,462,632 | B1 * | 6/2013 | Vincent | H04L 47/25 370/235 |
| 8,605,217 | B1 * | 12/2013 | Lafon | H04N 21/4305 348/441 |
| 2003/0014477 | A1 * | 1/2003 | Oppenheimer | H04L 12/1813 709/203 |
| 2003/0137690 | A1 * | 7/2003 | Hoover | G06F 3/1204 358/1.15 |
| 2003/0140090 | A1 * | 7/2003 | Rezvani | G06F 17/3089 709/203 |
| 2005/0091383 | A1 * | 4/2005 | Bender | H04L 67/1097 709/228 |
| 2006/0190824 | A1 * | 8/2006 | Montulli | G06F 17/30038 715/731 |
| 2008/0019395 | A1 * | 1/2008 | Aithal | H04L 1/0002 370/468 |
| 2008/0126517 | A1 * | 5/2008 | Nakatsuka | H04L 67/16 709/219 |
| 2010/0088404 | A1 * | 4/2010 | Mani | H04L 67/125 709/224 |
| 2010/0093441 | A1 * | 4/2010 | Rajaraman | H04L 67/2823 463/42 |
| 2011/0153985 | A1 * | 6/2011 | Saha | G06F 21/602 712/42 |
| 2014/0095698 | A1 * | 4/2014 | Grier | H04L 41/5032 709/224 |
| 2014/0325436 | A1 * | 10/2014 | Kim | H04M 1/72519 715/790 |

FOREIGN PATENT DOCUMENTS

| | | |
|---|---|---|
| CN | 101345608 A | 1/2009 |
| CN | 101860479 A | 10/2010 |
| CN | 102647251 A | 8/2012 |
| WO | 2012177037 A2 | 12/2012 |

OTHER PUBLICATIONS

Bencsath et al., "XCS based hidden firmware modificaiton on embedded devices", 2011.*
Berners-Lee, "Hypertext Transfer Protocol (HTTP) 1.0", 1994.*
Berners-Lee et al., "Uniform Resource Identifier (URI): Generic Syntax", RFC 3986, 2005.*
Borenstein et al., "MIME (Multipurpose Internet Mail Extensions): Mechanisms for Specifying and Describing the Format of Internet Message Bodies", RFC 1341, 1992.*
Fielding et al., "Hypertext Transfer Protocol—HTTP/1.1", RFC2616, 1999.*
Fielding et al., "Hypertext Transfer Protocol (HTTP/1.1): Conditional Requests", RFC7232, 2014.*
Fielding et al., "Hypertext Transfer Protocol (HTTP/1.1): Semantics and Content", RFC7231, 2014.*
Fielding et al., "Hypertext Transfer Protocol—HTTP/1.1", RC2068, 1997.*
Fielding et al., "Hypertext Transfer Protocol (HTTP/1.1): Caching", RFC7234, 2014.*
Fielding et al., "Hypertext Transfer Protocol (HTTP/1.1): Message Syntax and Routing", RC7230, 2014.*
Information Sciences Institute, "Transmission Control Protocol DARP Internet Program Protocol Specification", RFC793, 1981.*
Kholodkov, "Resumable uploads over HTTP. Protocol specification", 2010.*
Merriam-Webster, "prompt", 2017.*
Nebel et al., "Form-based File Upload in HTML", RFC1867, 1995.*
Nottingham et al., "Hypertext Transfer Protocol (httpbis)", 2016.*
Palme et al., "MIME Encapsualtion of Aggregate Documents, such as HTML (MHTML)", RFC2557, 1999.*
Pantos et al., "HTTP Live Streaming", 2016.*
Postel et al., "File Transfer Protocol (FTP)", RFC595, 1985.*
RC, "HyperText Request", 1992.*
RC, "Updates to HTTP", 1992.*
W3, "HyperText Transfer Protocol", 2017.*
Wikipedia, "File transfer", 2017.*
Wikipedia, "Hypertext Transfer Protocol", 2015.*
Wikipedia, "Transmission Control Protocol", 2017.*
Merriam-Webster, "exponent", 2017.*
Wikipedia, "Exponential function", 2017.*
Case et al., "A Simple Network Management Protocol (SNMP)", RFC 1157, 1990.*
McCloghrie et al., "Management Information Base for Network Management of TCP/IP-based internets: MIB-II", RFC 1213, 1991.*
Rose et al., "Concise MIB Definitions", RFC1212, 1991.*
Waldbusser, "Remote Network Moniotring Management INformation Base", RFC 1271, 1991.*
Waldbusser, "Token Ringe Extensions to the Remote Network Monitoring MIB", RFC1513, 1993.*
Waldbusser, "Remote Network Monitoring Management Information Base", RFC 1757, 1995.*
The World Intellectual Property Organization (WIPO) International Search Report for PCT/CN2014/076010 dated Jun. 30, 2014 3 Pages.
The State Intellectual Property Office of the People's Republic of China (SIPO) Office Action 1 for 201310187948.8 dated Nov. 13, 2017 6 Pages (including translation).

* cited by examiner

ELECTRONIC DEVICE, STORAGE MEDIUM AND FILE TRANSFERRING METHOD

CROSS REFERENCE

The application is a U.S. continuation application under 35 U.S.C. § 111(a) claiming priority under 35 U.S.C. §§ 120 and 365(c) to International Application No. PCT/CN2014/076010 filed Apr. 23, 2014, which claims the priority benefit of a CN patent application serial No. 201310187948.8, titled "file transferring method and apparatus" and filed on May 20, 2013, which is incorporated by reference herein in its entirety for all intended purposes.

TECHNICAL FIELD

The present invention relates to network communication technology, and more particularly to an electronic device, a storage medium and a file transferring method.

BACKGROUND

To transfer a large-size file from a sender to a receiver over the internet the file is usually split into several file segments and the segments could be transferred individually. After sending a file segment, the sender monitors segment confirming message sent from the receiver. According to segment identifier included in the segment confirming message, the sender could know which file segment is successfully transferred to the receiver. If the sender fails to receive the segment confirming message of a file segment over a predetermined time period after sending the file segment, the send should resend the file segment, and the predetermined time period is defined as the timeout period of the file transferring process. The timeout period is usually set as a constant value or a dynamic value according to the size of the file segment and average network bandwidth of the internet.

However, if the timeout period is calculated from the size of the file segment and the average network bandwidth of the internet, the timeout period is too small for those networks whose available bandwidth is far lower than the average network bandwidth of the internet. For example, a network quality of a mobile network, especially non-Wi-Fi network (e.g., 2G/3G mobile network) fluctuates sharply and significantly. Thus there may be a big gap between statistical average bandwidth and the actual available bandwidth of a mobile network many times. To let the user know the time out during the file transferring process without waiting a long period, the timeout period is usually not calculated according to a network bandwidth far lower than then the average network bandwidth of the internet. In other words, the timeout period is a relatively small value. Therefore, if the timeout period is employed in a mobile network, the timeout issue would frequently occur as the actual available bandwidth fluctuates to a small value. As a result, a failure rate of file transferring over the mobile network is high.

The timeout period can also be calculated according to the size of the file segment and the recent actual bandwidth. However, the network quality of the mobile networks usually changes discontinuously or in other words; there is usually a bandwidth jump in mobile networks. For example, the bandwidth may decrease to about one-tenth of bandwidth of the current moment immediately. It is difficult to estimate the bandwidth of next moment according to the bandwidth of the current moment. Therefore, the timeout period calculated according to this method also leads to a high failure rate of file transferring over mobile networks.

In addition, the file segment should be resent if the transferring process expires, and the network traffic consumed in the failed transferring process is wasted. Thus, the higher the failure rate of segment transferring is, the more network traffic would be consumed to transfer a same file.

SUMMARY

To improve success rate for transferring a single file segment and reduce waste of network traffic caused by an inappropriate timeout period during a process of transferring the file, the present invention provides an electronic device, a storage medium and a method for transferring a file.

The present invention provides an electronic device. The electronic device includes a storage system; at least one processor; one or more programs stored in the storage system and executed by the at least one processor. The one or more programs include: a submitting module that submits a file segment to be transferred to a target device to a transferring queue in a main process; a delay module that waits for an interrupt signal; a first monitoring module that monitors whether the main process produces upload traffic during a preset time period; if the main process does not produce the upload traffic during the preset time period, the first monitoring module sending out an interrupt request which includes information that the main process does not produce the upload traffic during the preset time period; a second monitoring module that triggers the delay module to stop waiting for the interrupt signal when a response from the target device or the interrupt pending request are received.

The present invention further provides a method for transferring a file. The method includes: (a) submitting a file segment to be transferred to a target device to a transferring queue in a main process; (b) waiting for an interrupt signal; (c) monitoring whether the main process produces upload traffic during a preset time period, and if the main process does not produce the upload traffic during the preset time period, sending out an interrupt request which includes information that the main process does not produce the upload traffic during the preset time period; (d) ending the step (b) when a response from the target device or the interrupt pending request are received.

The present invention further provides a non-transitory storage medium storing a set of instructions. The set of instructions is capable of being executed by a processor of an electronic device; cause the electronic device to execute a method for transferring a file. The method includes: (a) submitting a file segment to be transferred to a target device to a transferring queue in a main process; (b) waiting for an interrupt signal; (c) monitoring whether the main process produces upload traffic during a preset time period, and if the main process does not produce the upload traffic during the preset time period, sending out an interrupt request which includes information that the main process does not produce the upload traffic during the preset time period; (d) ending the step (b) when a response from the target device or the interrupt pending request are received.

Compared with the prior art, the technical solutions provided by the embodiments of the present invention can monitor duration of no upload traffic in a main process that is configured to transmit the file, and determine whether the file segment is failed to be transferred according to the monitored result. According to the above method and electronic device: the success rate for transferring the single file segment can be improved, and the waste of network traffic caused by an inappropriate timeout period during a file transferring process can be reduced.

The above description is only an overview of the technical solutions of the present invention. In order to understand the technical solutions of the present invention more clearly, implement the technical solutions of the present invention according to the following specification, and make the purpose, the characteristics, and the advantages of the present invention more easily to understand, hereinafter, combined with accompanying drawings, embodiments of the present invention are described as follows.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF PREFERRED EMBODIMENTS

The terminology used in the description of the present invention herein is for the purpose of describing particular examples only and is not intended to be limiting of the present invention. As used in the description of the present invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
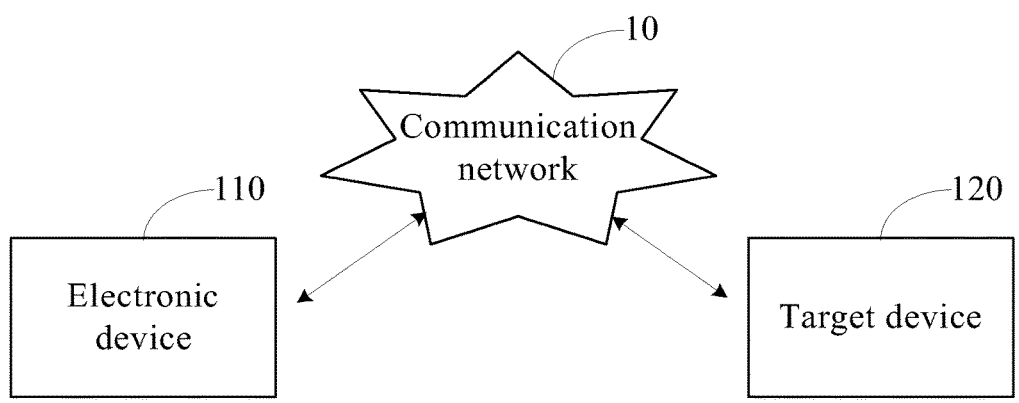
FIG. 1 is a schematic diagram of an exemplary runtime environment of a file transferring method.

FIG. 1 is a schematic diagram of an exemplary runtime environment of a file transferring method. The exemplary environment may include an electronic device 110, a target device 120, and a communication network 10. The electronic device 110 and the target device 120 may be coupled through the communication network 10 for information exchanging, such as sending/receiving files such as images, documents, videos, etc. Although only one electronic device 110 and one target device 120 are shown in the environment, any number of terminals or servers may be included, and other devices may also be included.

The communication network 10 may include any appropriate type of communication networks for providing network connections to the electronic device 110 and target device 120. For example, the communication network 10 may include the internet, mobile internet (e.g., the 2G/3G mobile networks), local area networks (LAN) or other types of computer networks or telecommunication networks, either wired or wireless.

In some cases, the electronic device 110 and target device 120 may refer to any appropriate user terminal with certain computing capabilities, such as a person computer (PC), a work station computer, a server computer, a hand-held computing device (tablet), a smart phone or mobile phone. The electronic device 110 and the target device 120 can be stationary or mobile.

An exemplary computing system for the electronic device 110 and target device 120 may include a least one processor, a storage system, a monitor or display screen, a keyboard or a touch screen, a communication module, peripherals, and one or more bus to couple the devices together. Certain devices may be omitted and other devices may be included.

The processor may include any appropriate processor or processors. Further, the processor can include multiple cores for multi-thread or parallel processing. The storage system may include memory modules, such as ROM, RAM, and flash memory modules, and mass storages, such as CD-ROM, U-disk, removable hard disk, etc. The storage system is non-transitory computer readable. The storage system may store computer programs for implementing various processes, when executed by processor.

In the embodiment, the electronic device 110 is configured to transfer a file to the target device 120 over the communication network 10. The electronic device 110 is regarded as a sender, and the target device 120 is regarded as a receiver.

Embodiment 1

Figure 2:
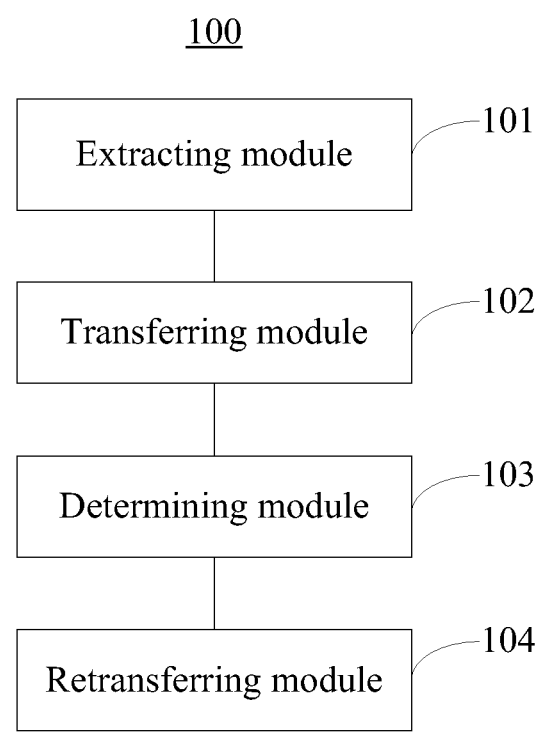
FIG. 2 is a block diagram of a file transferring system included in an electronic device provided in embodiment 1.

Referring to FIG. 2, the embodiment of the present invention provides the electronic device 110 including a file transferring system 100, which is used for transferring a file from the electronic device 110 to the target device 120. The file transferring system 100 may be in form of one or more programs that are stored in the storage system of the electronic device 110 and executed by the at least one processor of the electronic device 110.

In the embodiment, the file transferring system 100 may include an extracting module 101, a transferring module 102, a determining module 103, and a retransferring module 104. The modules 101-104 may comprise a plurality of functional modules each comprising one or more programs or computerized codes that are stored in the storage system of the electronic device 110, and can be accessed and executed by the at least one processor of the electronic device 110. In general, the word "module", as used herein, refers to logic embodied in hardware or firmware, or to a collection of software instructions, written in a programming language, such as JAVA, C, or assembly. One or more software instructions in the modules may be embedded in firmware, such as in an EPROM. The modules described herein may be implemented as either software and/or hardware modules, and may be stored in any type of non-transitory computer-readable storage medium or other storage device. Some non-limiting examples of non-transitory computer-readable storage medium include CDs, DVDs, BLU-RAY, flash memory, and hard disk drives.

Figure 3:
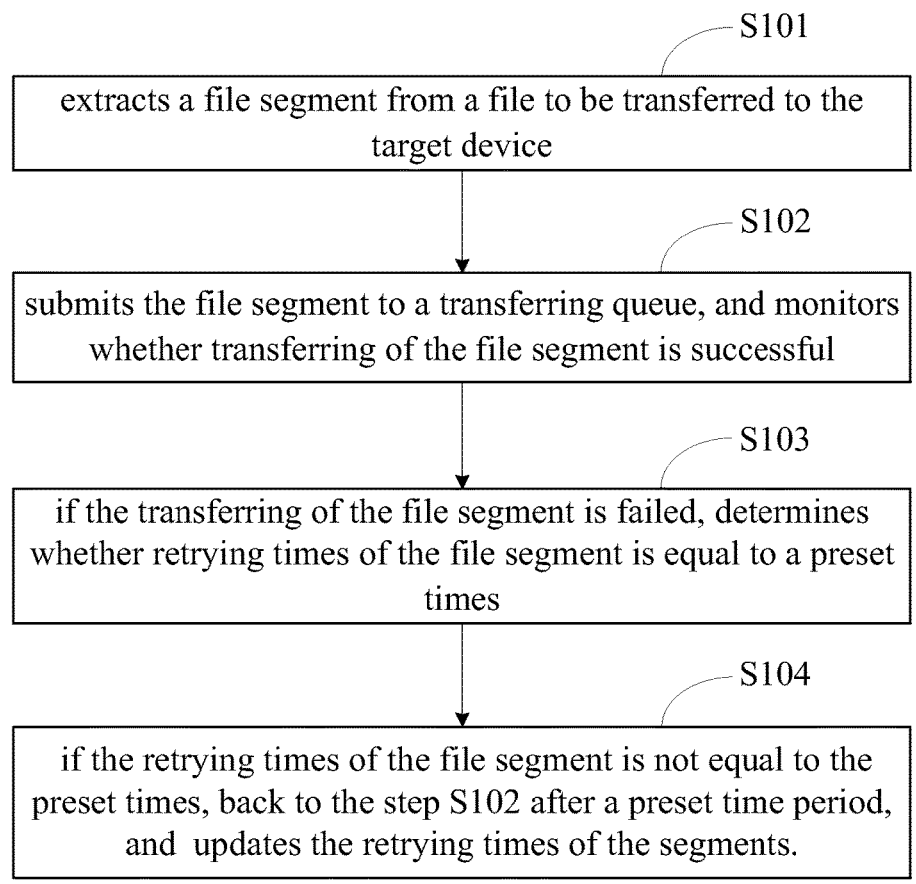
FIG. 3 is a flowchart of a file transferring method in accordance with embodiment 1.

Referring to FIG. 3, the present embodiment further provides a method for transferring the file from the electronic device 110 to the target device 120. The method includes following steps:

Step S101: the extracting module 101 extracts a file segment from a file to be transferred to the target device 120;

Step S102: the transferring module 102 submits the file segment to a transferring queue, and monitors whether transferring of the file segment is successful;

Step S103: if the transferring of the file segment is failed, the determining module 103 determines whether retrying times of the file segment is equal to a preset times;

Step S104: if the retrying times of the file segment is not equal to the preset times, back to the step S102 after a preset time period, and the retransferring module 104 updates the retrying times of the segments.

Depending on the requirements, additional steps may be added, or removed, and the ordering of the steps may be changed.

According to the above method, if fails to transfer a single file segment of the file, the file segment of the file is retransferred after a preset time period. Compared to the manner that immediately resend the file segment after failing to transfer the file segment, the method provided by the present embodiment can improve success rate for transferring the single file segment of the file, and further improve success rate for transferring the file.

In some cases, the above steps are described in detail as follows:

In step S101, the file may be an image, a document or a video. The file may be stored in the storage system of the electronic device 110. In the present embodiment, the extracting module 101 can extract the file segment from the file according a fixed segment size. If it is the first time to transfer the file, the extracting module 101 extracts a first file segment starting from the first byte of the file. When the first file segment is successfully transferred to the target device 120, the extracting module 101 sets a starting point of next file segment of the file according to the file segment size. Then, the similar process is repeated until finishing the file transferring task.

If it is not the first time to transfer the file, for example, the transferring process fails or is broken is the last transferring process, the file should be retransferred. Then, the extracting module 101 still extracts the first file segment according starting from the first byte of the file. When the first file segment has been transferred to the target device 120, the extracting module 101 receives number of bytes of the file from the target device 120 that has been received by the target device 120. The extracting module 101 sets the number of bytes as a starting point of next file segment of the file, and this manner achieves capability of resuming the transferring at the breakpoint.

In step S102, the electronic device 110 may connects to the target device 120 based on the transferring control protocol (TCP). Accordingly, the transferring queue may be a TCP output buffer. Each file segment in the output buffer is submitted to operation system of the electronic device 110 for sending the file segment in the physical layer. It is to be noted that the detailed sending process in the physical layer is controlled by the operating system and is not further described here.

In the present embodiment, before submitting the file segment to the transferring queue, the transferring module 102 can process the file segment and the file, for example, using a hash algorithm such as message-digest algorithm 5 to obtain a segment verifying key and a file verifying key. The transferring module 102 further encapsulates the file segment, the segment verifying key and the file verifying key into a data package, and submits the data package to the transferring queue. The segment verifying key and the file verifying key can be used by the target device 120 to verify the integrity of the file segment and the file when the file is transferred.

The transferring module 102 may further monitor whether transferring of the file segment is successful according to a predefined timeout period. If a response is not received from the target device 120 during the timeout period, the transferring module 120 determines that the transferring of the file segment is failed. If the response is received from the target device 120 during the timeout period, the transferring module 120 determines whether the transferring of the file segment is successful according to the response.

In step 103, the retrying times are defined as times that the file segment is resubmit to the transferring queue when the transferring of the file segment is failed. When a file segment is submitted to the transferring queue the first time, the retrying times are set to zero. Every time the file segment is resubmit to the transferring queue, the retrying times plus one. If the transferring times of the file segment reach to a threshold value, the determining module 103 determines that the transferring of the file to the target device 120 is failed; in that case, the transferring could be cancelled or the file could be transferred again.

In step S104, the preset time period can be extended with increase of the retrying times. For example, if a reference time Ti is set, the retrying times are regarded as C, and the preset time period is regarded as T0, a formula to calculate the T0 may be: $T0=Ti*2^{(C-1)}$. When the transferring of file segment fails for the first time, the file segment is retransferred after a time period Ti. If the file segment fails to be transferred again, the file segment is retransferred after a time period Ti*2, and so on. In a network with terrible quality, the network takes a long time for back to a normal state from a failure state. In that case, if the file segment is retransferred after the preset time period, the success rate for transferring the file segment and the file can be improved.

Embodiment 2

Figure 4:
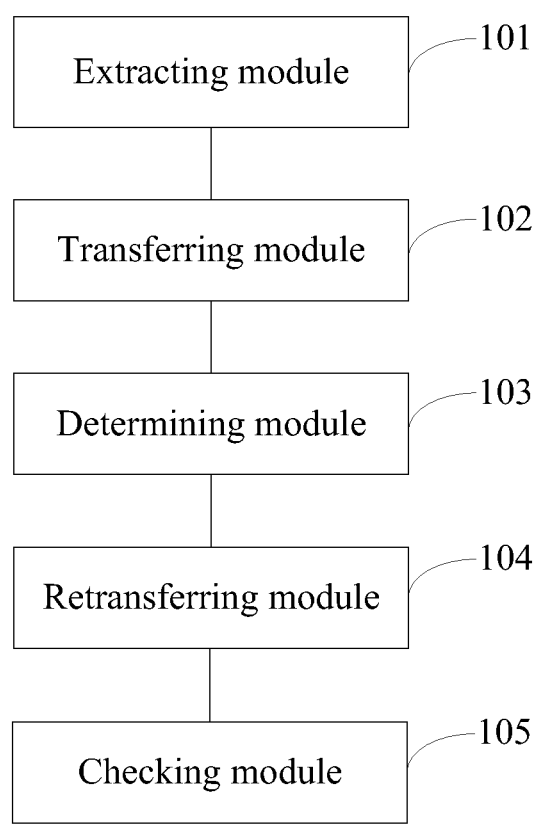
FIG. 4 is a block diagram of a file transferring system included in an electronic device provided in embodiment 2.

To make sure the file is completely transferred to the target device 120, referring to FIG. 4, the present embodiment provides the electronic device 110 including a file transferring system 200. Compared to the file transferring system 100 of the embodiment 1, the file transferring system 200 further includes a checking module 105.

Figure 5:
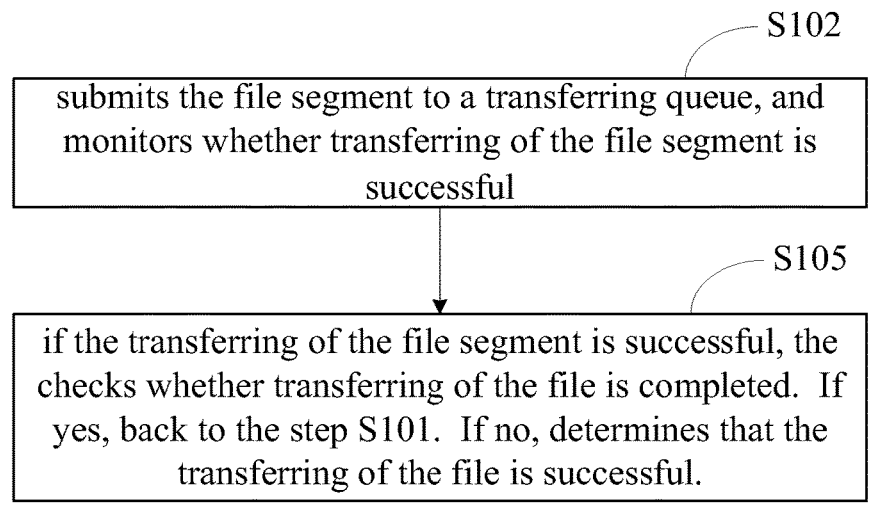
FIG. 5 is a flowchart of a file transferring method in accordance with embodiment 2.
Figure 6:
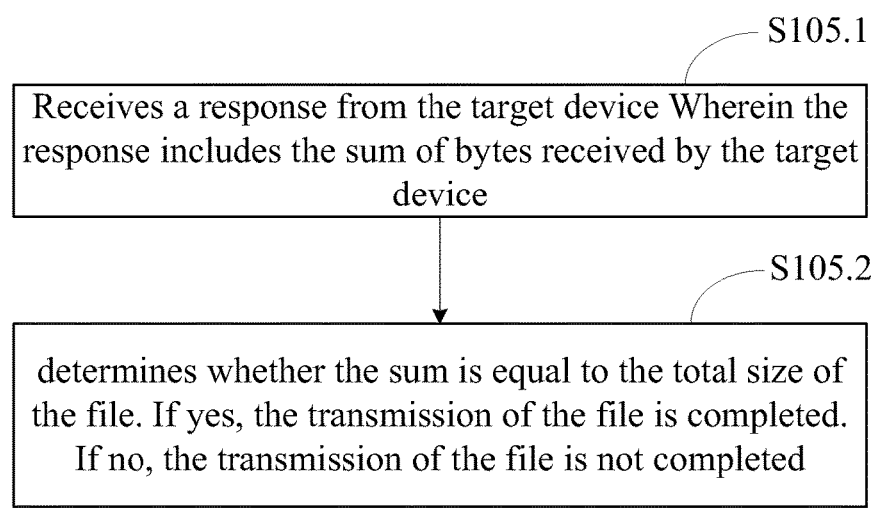
FIG. 6 is a flowchart of a method for checking whether transferring of the file is completed in the method shown in FIG. 5.

Referring to FIG. 5, the present embodiment further provides a method for transferring the file from the electronic device 110 to the target device 120. Compared to the method provided by the embodiment 1, the method provided by the embodiment 2 further includes following steps after the step S102:

Step S105: if the transferring of the file segment is successful, the checking module 105 checks whether transferring of the file is completed. If the transferring of the file is not completed, back to the step S101. If the transferring of the file is completed, the checking module 105 determines that the transferring of the file is successful. Specifically, referring to FIG. 6, a method for checking whether transferring of the file is completed includes following steps:

Step S105.1: the checking module 105 receives a response from the target device 120. The response includes the sum of bytes received by the target device 120.

Step S105.2, the checking module 105 determines whether the sum is equal to the total size of the file. If the sum is equal to the total size of the file, the checking module 105 determines that the transferring of the file is completed. If the sum is not equal to the total size of the file, the checking module 105 determines that the transferring of the file is not completed.

The steps above can check whether the transferring of the file is completed. If the transferring of the file is not completed, the extracting module 101 continues to extract a next file segment from the file for transferring, until the transferring of the file is completed.

Embodiment 3

When a file segment of the file is transferred in a network with certain quality and bandwidth, the transferring rate of the network reaches a maximum only when a size of the file segment conforms to a specific value. Therefore, when the file is transferred in segments with fixed size over a network, if the quality of the network is great but the size is relatively small, the transferring rate of the network may be limited. Specially, in a mobile network with changeable bandwidth and quality, if the size of the file segment is inappropriate, the transferring capability of the mobile network is not fully utilized, and the file transferring rate is limited.

Figure 7:
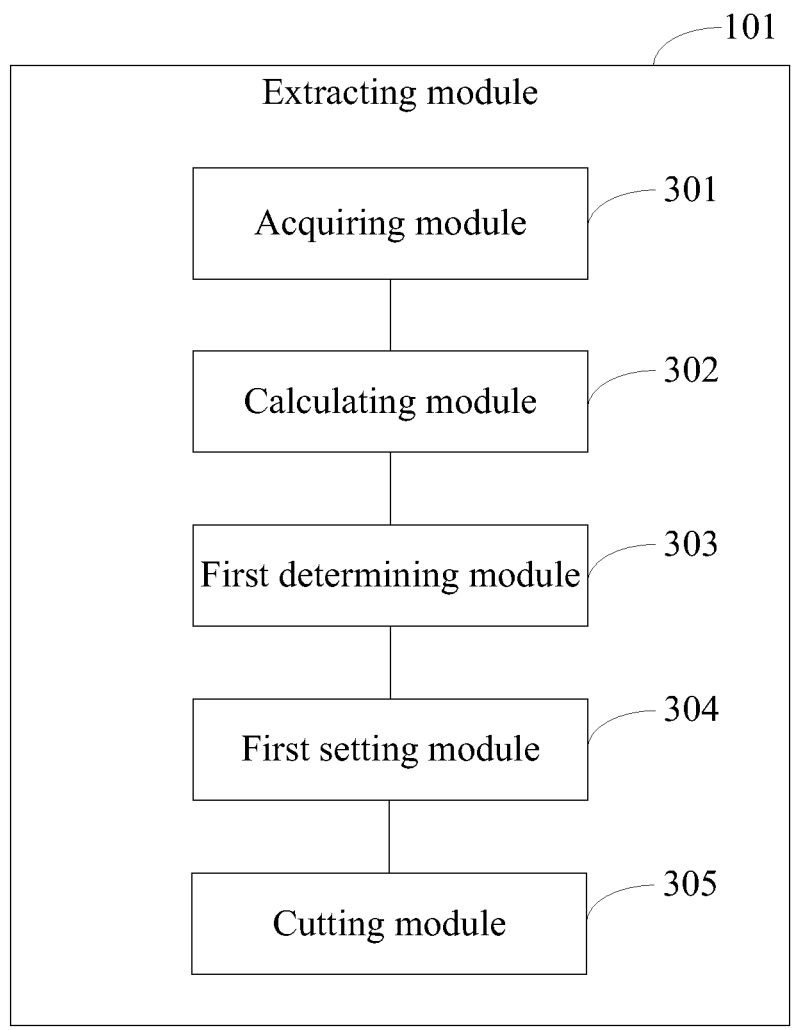
FIG. 7 is a block diagram of a file transferring system included in an electronic device provided in embodiment 3.

To fully utilize the bandwidth and transferring capability of a network, a size of a current file segment should be matched to the current network quality and bandwidth. Referring to FIG. 7, the present embodiment provides the electronic device 110 including a file transferring system 300. Compared to the file transferring system 100 of the embodiment 1, the extracting module 101 further includes an acquiring module 301, a calculating module 302, a first determining module 303, a first setting module 304, and a cutting module 305.

Figure 8:
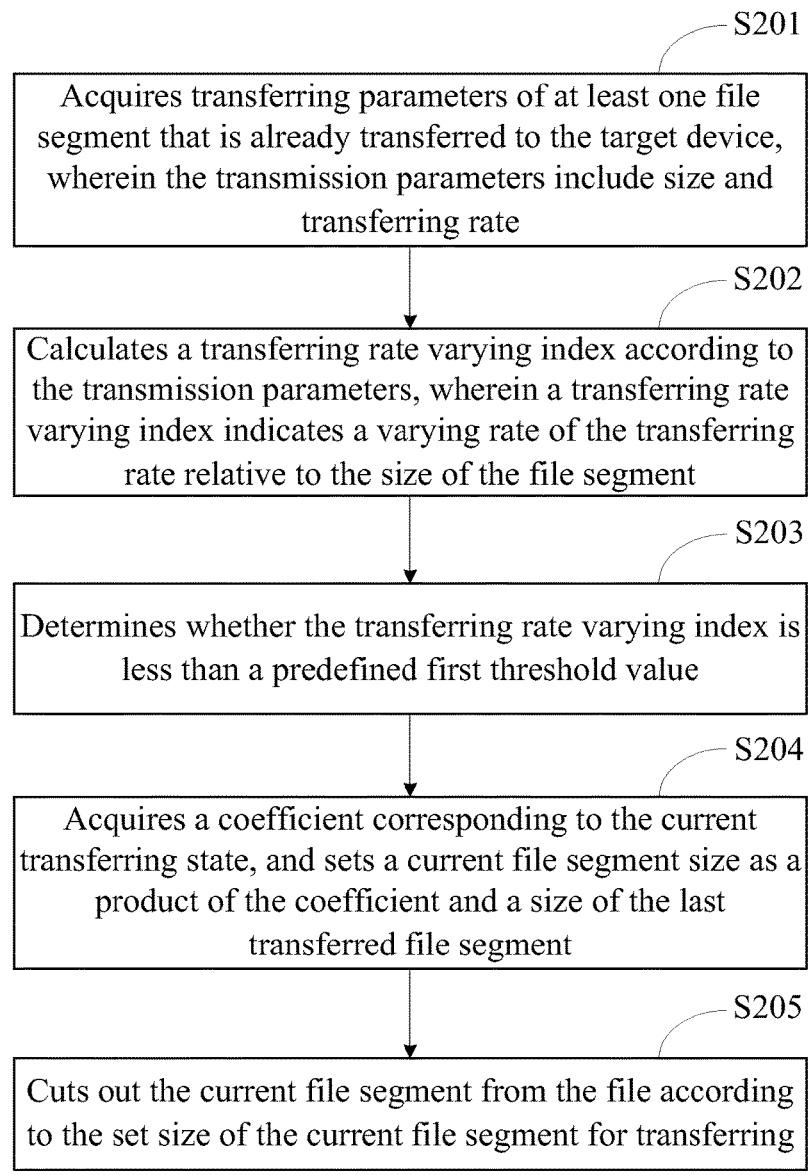
FIG. 8 is a flowchart of a file transferring method in accordance with embodiment 3.

Referring to FIG. 8, the present embodiment further provides a method for transferring the file from the electronic device 110 to the target device 120. Compared to the method provided by the embodiment 1, the step S101 of the method provided by the embodiment 3 further includes following steps:

Step S201: the acquiring module 301 acquires transferring parameters of at least one file segment that is already transferred to the target device 120. The transferring parameters include the segment size and the transferring rate.

Step S202: the calculating module 302 calculates a transferring rate varying index according to the transferring parameters of the at least one file segment that is already transferred to the target device 120. The transferring rate varying index indicates a varying rate of the transferring rate relative to the size of the file segment. The at least one file segment that is already transferred to the target device 120 is regarded as at least one transferred file segment.

Step S203: the first determining module 303 determines whether the transferring rate varying index is less than a predefined first threshold value. If the transferring rate varying index is less than the first threshold value, the first determining module 303 updates a current transferring state with a different state.

Step S204: the first setting module 304 acquires a coefficient corresponding to the current transferring state, and sets a current file segment size as a product of the coefficient and a size of the last transferred file segment. The last transferred file segment is defined as the latest file segment that is already transferred to the target device 120. The current file segment is defined as a file segment that is to be transferred to the target device 120.

Step S205: the cutting module 305 cuts out the current file segment from the file according to the set size of the current file segment for transferring.

According to the above method, the size of the current file segment is variable and is matched to the current quality and bandwidth of the network, and the bandwidth and transferring capability of the network is fully utilized and the transferring rate is improved. In some cases, the steps above are described in detail as follows:

In step S201, the transferring rate can be calculated according to the size and transferring time of each file segment that is already transferred to the target device 120. The transferring time is defined as a time period from a corresponding file segment is sent to a response that indicates the file segment is completed transferred is received from the target device 120. The transferring rate can further be processed with smoothing using a predefined smoothing factor.

In step S202, the transferring rate varying index indicates a varying rate of the transferring rate relative to the varying rate of the file segment size. The transferring rate varying index indicates how the transferring rate varies according to the file segment size for the file segments that are already transferred to the target device. If the file segment size increases at a certain ratio and the transferring rate get a corresponding improving, the increasing rate of the file segment size meets the requirements for improving the transferring rate. If the file segment size increases at a certain ratio and the transferring rate doesn't get a corresponding improving, the increasing rate of the file segment size doesn't meet the requirements for improving the transferring rate, and the increasing rate of the file segment size should be slow down or kept at a fixed value.

In step S203, the first threshold value is configured to estimate whether the increasing rate of the file segment size can meet the requirements of improving the transferring rate. The current transferring state indicates the increasing rate of the file segment size. In the present embodiment, the current transferring state may be a first state, a second state, or a third state. Each of the first state, the second state, and the third state is corresponding to a coefficient that indicates the increasing rate of the file segment size. Specifically, coefficients of the first state and the second state are both larger than one, and the coefficient of the first state is larger than the coefficient of the second state, that is, the increasing rate of the file segment size corresponding to the first state is higher than that of the file segment size corresponding to the second state. The coefficient of the third state is equal to one, that is, the increasing rate of the file segment size corresponding to the third state keeps unchanged.

Specifically, in the step S203, the first determining module 303 further ascertains the current transferring state. If the transferring rate varying index is less than the first threshold value, and the current transferring state is the first state, the first determining module 303 updates the current transferring state as the second state, that is to decrease the increase rate of the file segment size. If the transferring rate varying index is less than the first threshold value, and the current transferring state is the second state, the first determining module 303 updates the current transferring state as the third state, that is to further decrease the increase rate of the file segment size.

In step S204, the first setting module 304 acquires the coefficient corresponding to the current transferring state, and sets the size of the current file segment as the product of the coefficient and the size of the last transferred file segment. If the current transferring state is the first state or the second state, the size of the current file segment is accordingly larger than the size of the last transferred file segment. If the current transferring state is the third state, the size of the current file segment is the same as the size of the last transferred file segment.

In step S205, the cutting module 305 cuts out the current file segment from the file according to the set size of the current file segment, and triggers the transferring module 102 to transmit the current file segment.

Embodiment 4

Figure 9:
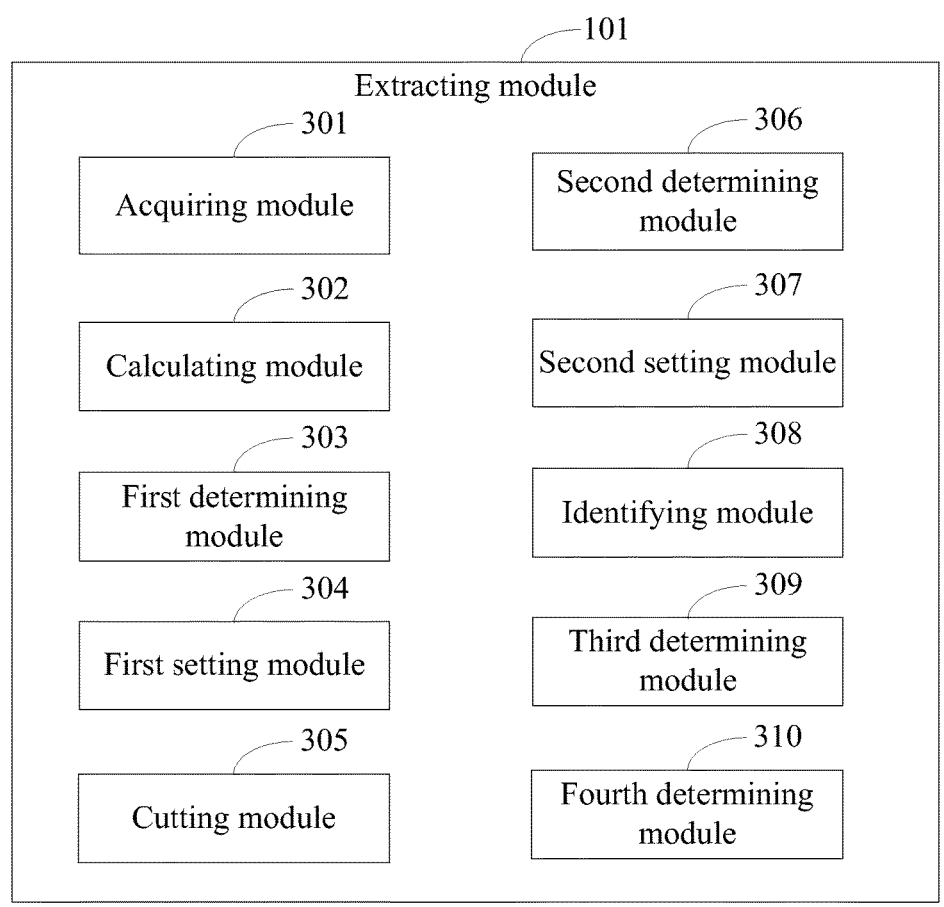
FIG. 9 is a block diagram of a file transferring system included in an electronic device provided in embodiment 4.

To fully utilize the bandwidth and transferring capability of a network, and further improve the file transferring rate, referring to FIG. 9, the present embodiment provides the electronic device 110 including a file transferring system 400. Compared to the file transferring system 300 of the embodiment 3, the extracting module 101 further includes a second determining module 306, a second setting module 307, an identifying module 308, a third determining module 309, and a fourth determining module 310.

Figure 10:
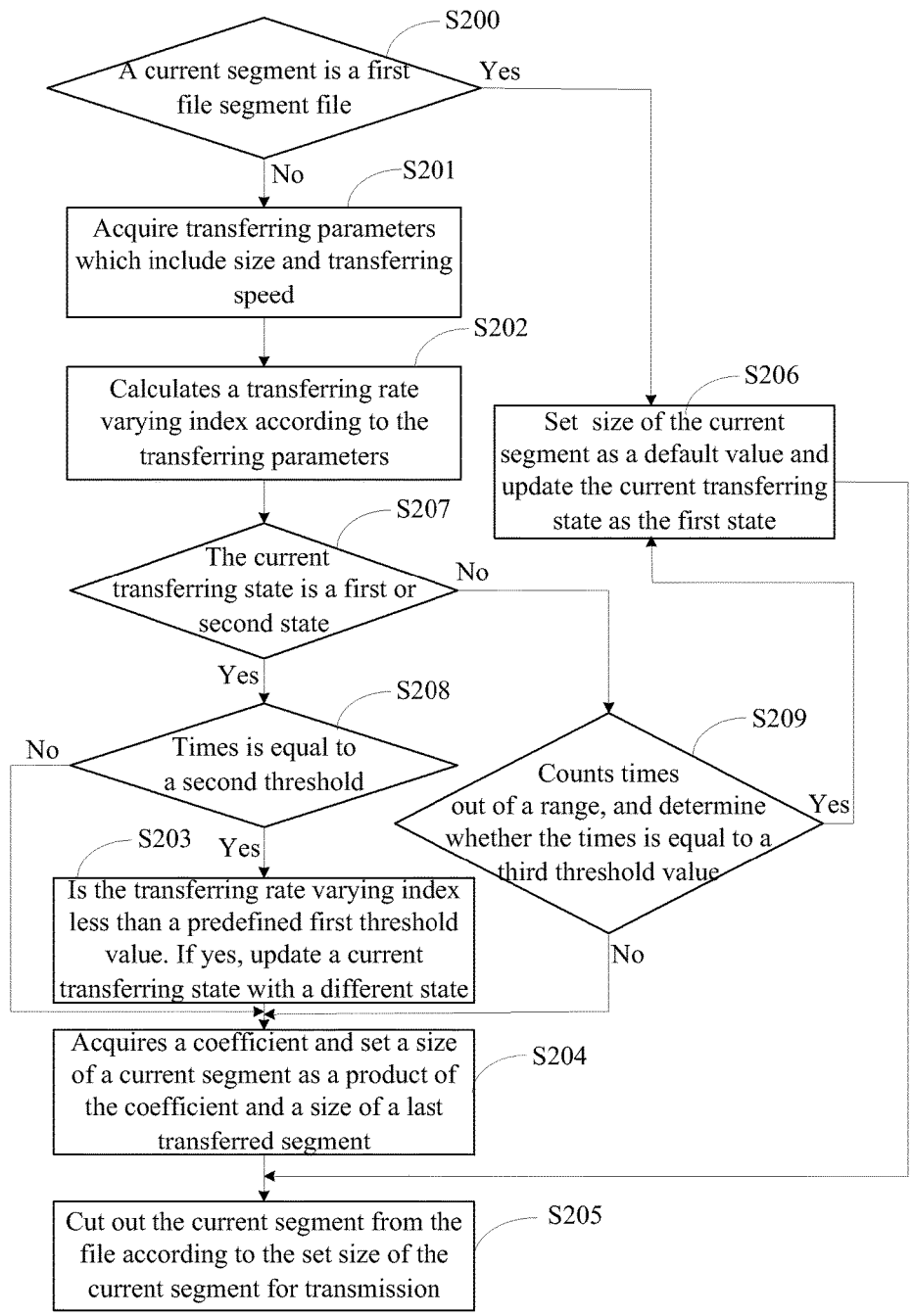
FIG. 10 is a flowchart of a file transferring method in accordance with embodiment 4.

Referring to FIG. 10, the present embodiment further provides a method for transferring the file from the electronic device 110 to the target device 120. Compared to the method provided by the embodiment 3, the method provided by the embodiment 4 further includes following steps:

Step S200: prior to perform the step S201, the second determining module 306 determines whether the current file segment is a first file segment of the file. If the current file segment is the first file segment of the file, step S206 is executed. If the current file segment is not the first file segment of the file, step S201 is executed.

Step S206: the second setting module 307 sets the size of the current file segment as a default value in accordance with a type of the current network, such as the second generation telecommunication network, the third generation telecommunication network, or the Wi-Fi network, then the second setting module 307 updates the current transferring state as the first state, and the step S205 is executed.

Step S207: prior to perform the step S203, the identifying module 308 determines the current transferring state is the first state, the second state or the third state. If the current transferring state is the first state or the second state, a step S208 is executed. If the current transferring state is the third state, a step S209 is executed.

Step S208: the third determining module 309 determines in the at least one transferred file segment, whether a use frequency of each file segment size reaches to a predefined second threshold value, such as two. If the use frequency of a file segment size reaches to the second threshold value, the step S203 is executed. If the use frequency of a file segment size reaches to the second threshold value, the step S204 is executed.

Step S209: the fourth determining module 310 counts the maximum number of at least one lastly transferred file segments whose transferring rate all exceed a predetermined range, and further determines whether the maximum number reaches to a predefined third threshold. If the maximum number reaches to the third threshold value, the step S204 is executed. If the maximum number reaches to the third threshold value, the step S206 is executed.

In addition, in some cases, size of part of the file to be transferred is less than the set size of the current file segment, or though the size of part of the file to be transferred is more than the set size of the current file segment, the size of part of the file to be transferred is so small that it is not necessary to split the file. Therefore, the step S204 or step 206 may further include: the first setting module 304 or the second setting module 307 determines whether the size of part of the file to be transferred is less than a predefined fourth threshold value. If the size of part of the file to be transferred is less than the fourth threshold value, the first setting module 304 or the second setting module 307 sets the size of the current file segment as the size of part of the file to be transferred, and the step S205 is executed. If the size of part of the file to be transferred is not less than the fourth threshold value, the step S205 is executed.

According to above method, the set size of the current file segment is matched to the quality and bandwidth of the network, and the file transferring rate is further improved.

Figure 11:
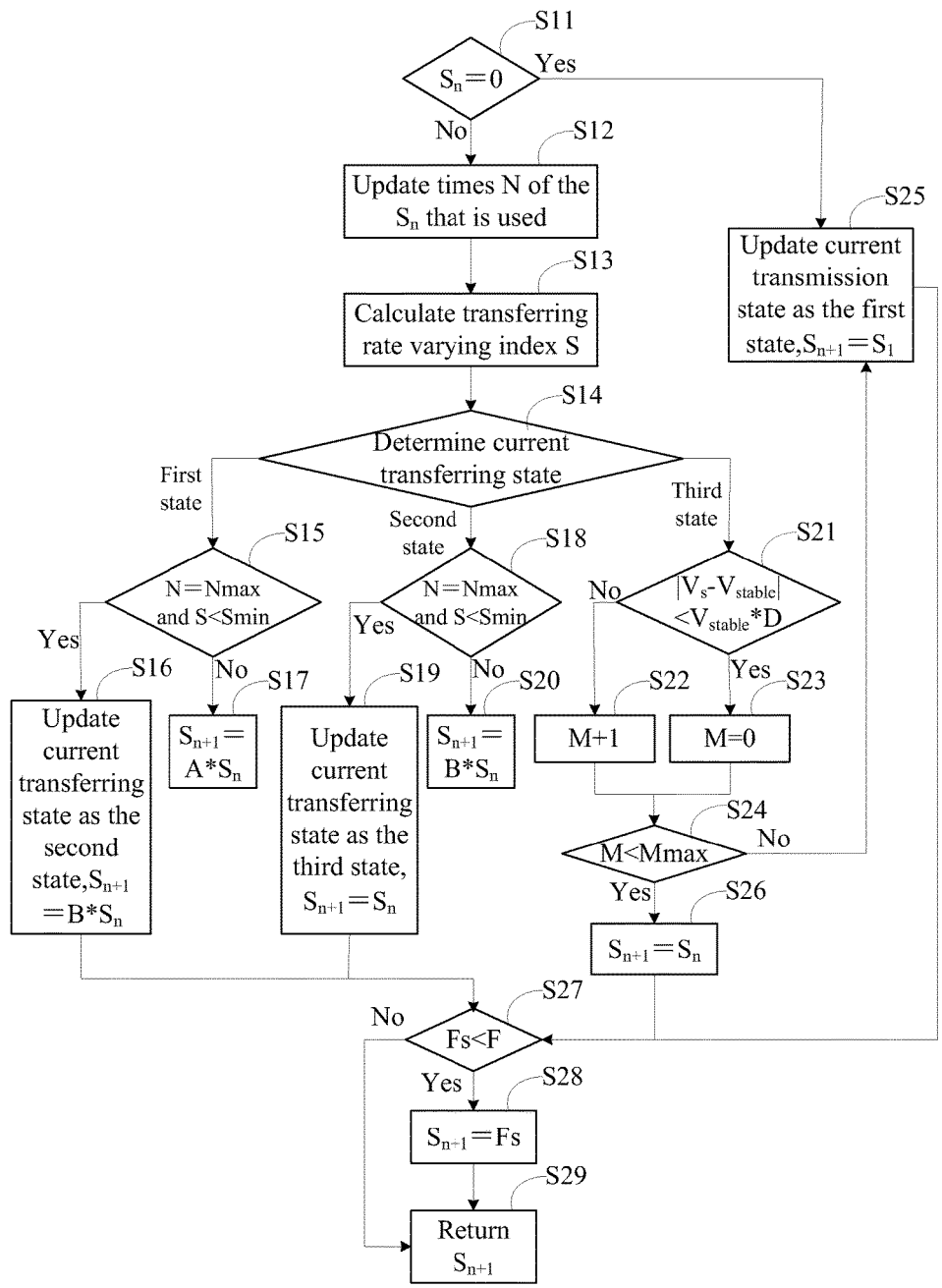
FIG. 11 is a detailed flowchart of the file transferring method for in accordance with the embodiment 4.

FIG. 11 is a detailed flowchart of the method for transferring a file in accordance with the embodiment 4. It is assumed that the acquired transferring parameters of the at least one transferred file segment includes: a size $S_1$ of the first file segment of the file, a smoothed transferring rate $V_1$ under the size $S_1$, a size $S_n$ of the last transferred file segment, a smoothed transferring rate $V_s$ under the size S, a size $S_0$ of a file segment that is different with the size $S_n$ and is transferred before the last transferred file segment, a smoothed transferring rate $V_0$ under the size $S_0$. The size of the current file segment is assumed as $S_{n+1}$. Compared to the method for transferring the file provided by the embodiment 4, the step S101 includes following steps:

Step S11: determining whether the $S_n$ is equal to zero. If the $S_n$ is not equal to zero, the current file segment is not the first file segment of the file, and step S12 is executed. If the $S_n$ is equal to zero, the current file segment is the first file segment of the file, and step S25 is executed.

Step S12: updating use frequency N of the size S.

Step S13: calculating the transferring rate varying index S according to the acquired $S_1$, $V_1$, $S_n$, $V_n$, $S_0$ and $V_0$. A formula to calculate the S is: $S=[(V_s-V_0)/V_1]/[(S_n-S_0)/S_1]$.

Step S14: determining the current transferring state. If the current transferring state is the first state, a step S15 is executed. If the current transferring state is the second state, a step S18 is executed. If the current transferring state is the third state, a step S21 is executed.

Step S15: determining whether the N is equal to the predefined second threshold value $N_{max}$, and whether the S is less than the predefined first threshold value $S_{min}$. If the N is equal to the predefined second threshold value $N_{max}$ and the S is less than the predefined first threshold value $S_{min}$, a step S16 is executed. If the N is not equal to the predefined second threshold value $N_{max}$ or the S is not less than the predefined first threshold value $S_{min}$, a step S17 is executed.

Step S16: updating the current transferring state as the second state, setting the $S_{n+1}$ as a product of the $S_n$ and a coefficient B corresponding to the second state, and a step S27 is executed.

Step S17: setting the $S_{n+1}$ as a product of the $S_n$ and a coefficient A corresponding to the first state, and the step S27 is executed.

Step S18: determining whether the N is equal to the predefined second threshold value $N_{max}$, and whether the S is less than the defined first threshold value $S_{min}$. If the N is equal to the predefined second threshold value $N_{max}$ and the S is less than the predefined first threshold value $S_{min}$, a step S19 is executed. If the N is not equal to the predefined second threshold value $N_{max}$ or the S is not less than the predefined first threshold value $S_{min}$, a step S20 is executed.

Step S19: updating the current transferring state as the third state, setting the $S_{n+1}$ equal to the $S_n$, and the step S27 is executed.

Step S20: setting the $S_{n+1}$ as a product of the $S_n$ and the coefficient B corresponding to the second state, and the step S27 is executed.

Step S21: determining whether a difference between the $V_s$ and a reference rate $V_{stable}$ corresponding to the third state is less than the predefined fifth threshold value. If the difference is not less than the fifth threshold value, the transferring rate of the last transferred file segment is out of the predefined range, and a step S22 is executed. If the difference is less than the fifth threshold value, the transferring rate of the last transferred file segment is not out of the predefined range, and a step S23 is executed. The fifth threshold value may be a product of the reference rate $V_{stable}$ and a percentage constant D.

Step S22: updating times M that the transferring rate of the at least one last transferred file segment is out of the predefined range, that is, M equals to M plus one.

Step S23: resetting the times M that the transferring rate of the at least one last transferred file segment is out of the predefined range. That is, M is reset as zero.

Step S24: determining whether the times M is equal to the predefined third threshold value $M_{max}$. If the times M is equal to $M_{max}$, a step S25 is executed. If the times M is not equal to $M_{max}$, step a S26 is executed.

Step S25: updating the current transferring state as the first state, setting the $S_{n+1}$ equal to the $S_n$, and the step S27 is executed.

Step S26: setting the $S_{n+1}$ equal to the $S_n$.

Step S27: determining whether a size Fs of part of the file to be transferred is less than the predefined fourth threshold value F. If Fs is less than F, a step S28 is executed. If Fs is not less than F, a step S29 is executed.

Step S28: setting the $S_{n+1}$ equal to Fs.

Step S29: cutting out the current file segment from the file according to the set size $S_{n+1}$ for transferring.

Embodiment 5

In the method for transferring a file provided by the embodiment 1, the transferring module 102 monitors whether transferring of the file segment is successful according to the predefined timeout period. The timeout period is usually defined as a fixed value according to a size of the file segment and average bandwidth of different kinds of network, or defined as a dynamic value according to the size of the file segment and recent bandwidth of one kind of network.

However, a network quality of a mobile network, especially non-Wi-Fi network (e.g., 2G/3G mobile network) fluctuates sharply and significantly. Thus there may be a big gap between statistical average bandwidth and the actual available bandwidth of a mobile network many times. Therefore, if the timeout period is defined as a fixed value according to the file segment size and the average bandwidth, the sender may easily determine that the file segment fails to be transferred to the receiver according to the fixed value, so that a failure rate for transferring a single file segment over the mobile network is high.

Furthermore, the network quality of a mobile network is changing sharply and discontinuously. It is difficult to estimate the bandwidth of next moment according to the bandwidth of the current moment that is measured accurately. Therefore, if the timeout period is defined as a dynamic value according to the file segment size and the recent bandwidth, the failure rate for transferring the single file segment of the file over the mobile network is also high. In addition, the file segment should be resent if the transferring process expires, and the network traffic consumed in the failed transferring process is wasted. Thus, the higher the failure rate of segment transferring is, the more network traffic would be consumed to transfer a same file.

Figure 12:
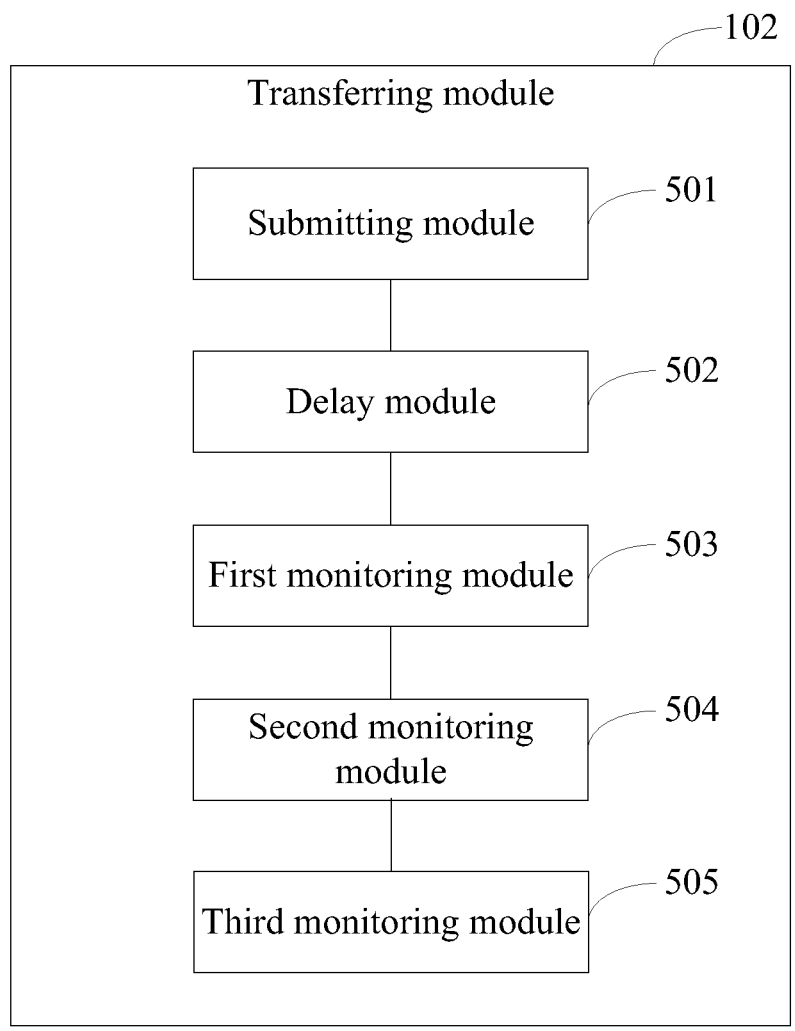
FIG. 12 is a block diagram of a file transferring system included in an electronic device provided in embodiment 5.
Figure 13:
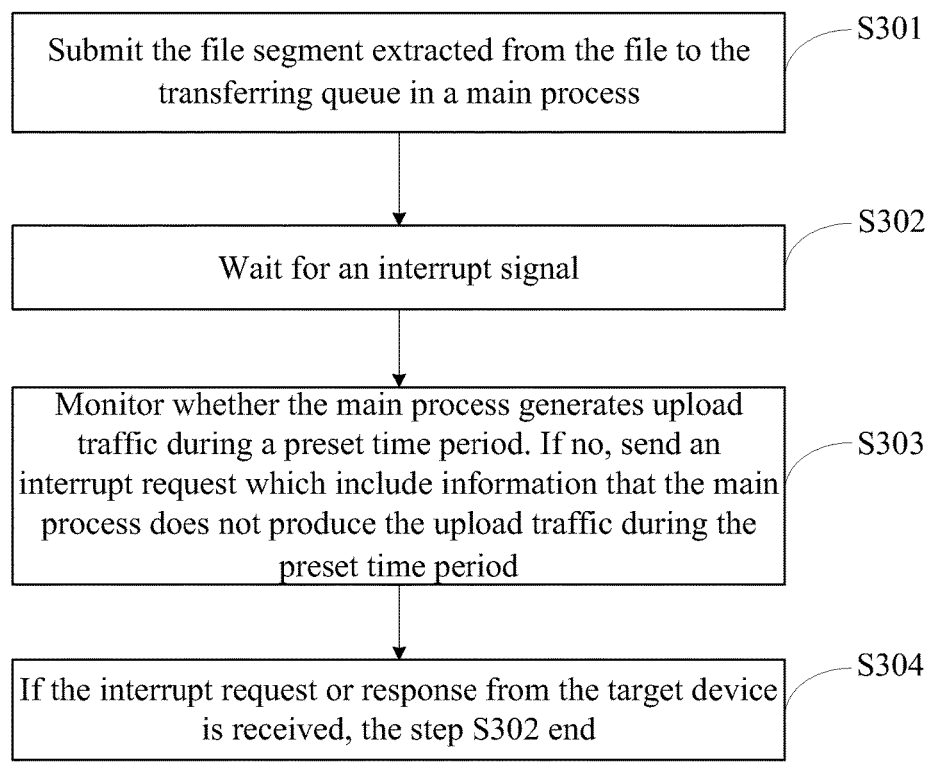
FIG. 13 is a flowchart of a file transferring method in accordance with embodiment 5.

To improve success rate for transferring a single file segment and reduce waste of network traffic caused by an inappropriate timeout period during a process of transferring the file, referring to FIG. 12, the present embodiment provides the electronic device 110 including a file transferring system 500. Compared to the file transferring system 100 of the embodiment 1, the transferring module 102 further includes a submitting module 501, a delay module 502, a first monitoring module 503, a second monitoring module 504, and a third monitoring module 505. Referring to FIG. 13, the embodiment of the present invention further provides a method for transferring the file from the electronic device 110 to the target device 120. Compared to the method provided by the embodiment 1, the step 102 further includes following steps:

Step S301: the submitting module 501 submits the file segment extracted from the file to the transferring queue in a main process.

Step S302: the delay module 502 waits for an interrupt signal.

Step S303: the first monitoring module 503 monitors whether the main process produces upload traffic during a preset time period. If the main process does not produces the upload traffic during the preset time period, the first monitoring module 503 sends out an interrupt request. The interrupt request includes information that the main process does not produce any upload traffic during the preset time period.

Step S304: if the second monitoring module 504 receives the interrupt request or response from the target device 120, the step S302 ends, that is, the delay module 502 stops waiting for the interrupt signal. According to the above method: the success rate for transferring the single file segment of the file can be improved, and the waste of network traffic caused by an inappropriate timeout period during a process of transferring the file can be reduced.

In some cases, the steps above are described in detail as follows:

In step S301, the main process is defined as a process that transmits the file segment. For example, the main process is a process of a file transferring application. The file segment may be encapsulated into a package according to hypertext transfer protocol (HTTP).

In step S302, the interrupt signal may include the interrupt request or the response from the target device 120. The delay module 502 can further interrupt the main process.

The step S303 may be executed in a monitoring process that is different from the main process. The preset time period may be set according to requirements, such as five seconds. The upload traffic is produced when the file segment is submitted to the transferring queue by the main process and the transferring queue submits the file segment to an operation system of the electronic device 120 for transferring via the communication network 10.

If the main process does not produce the upload traffic during the preset time period, the main process does not transmit any byte via the communication network 10 during the preset time period, and the file segment fails to be transferred. Therefore, the first monitoring module 503 should send out the interrupt request for stopping to wait the interrupt signal. When the interrupt request is sent, the step S303 ends and execution of the first monitoring module ends.

If the main process produces the upload traffic during the preset time period, the main process has transferred one or more bytes via the communication network 10 during the preset time period. That is to say, the file segment is being transferred. If the main process produces the upload traffic during the preset time period in the step S303, the first monitoring module 503 further prompts users that the file is being transferred using texts or animations.

In step S304, if the step S302 ends because of receiving the interrupt request, the second monitoring module 504 determines that the transferring of the file segment is failed according to the information that the main process does not produce the upload traffic during the preset time period in the interrupt request. If the step S302 ends because of the response from the target device 120, the second monitoring module 504 determines whether the file segment is received by the target device 120 according to the response. If the file segment is received by the target device 120, the second monitoring module 504 determines that the transferring of the file segment is successful. If the file segment is not received by the target device 120, the second monitoring module 504 determines that the transferring of the file segment is failed. When the response is received from the target device 120, the step S303 ends and the first monitoring module stops to monitor whether the main process produces upload traffic during the preset time period.

In addition, the method provided by the embodiment 5 further includes a step that is executed by the third monitoring module 505 for monitoring the failure of the communication network 10 after the step S302. For example, the communication network 10 is disconnected. If the communication network 10 is disconnected, the step S302 and the step 303 end, and the transferring of the file segment is failed.

Embodiment 6

Figure 14:
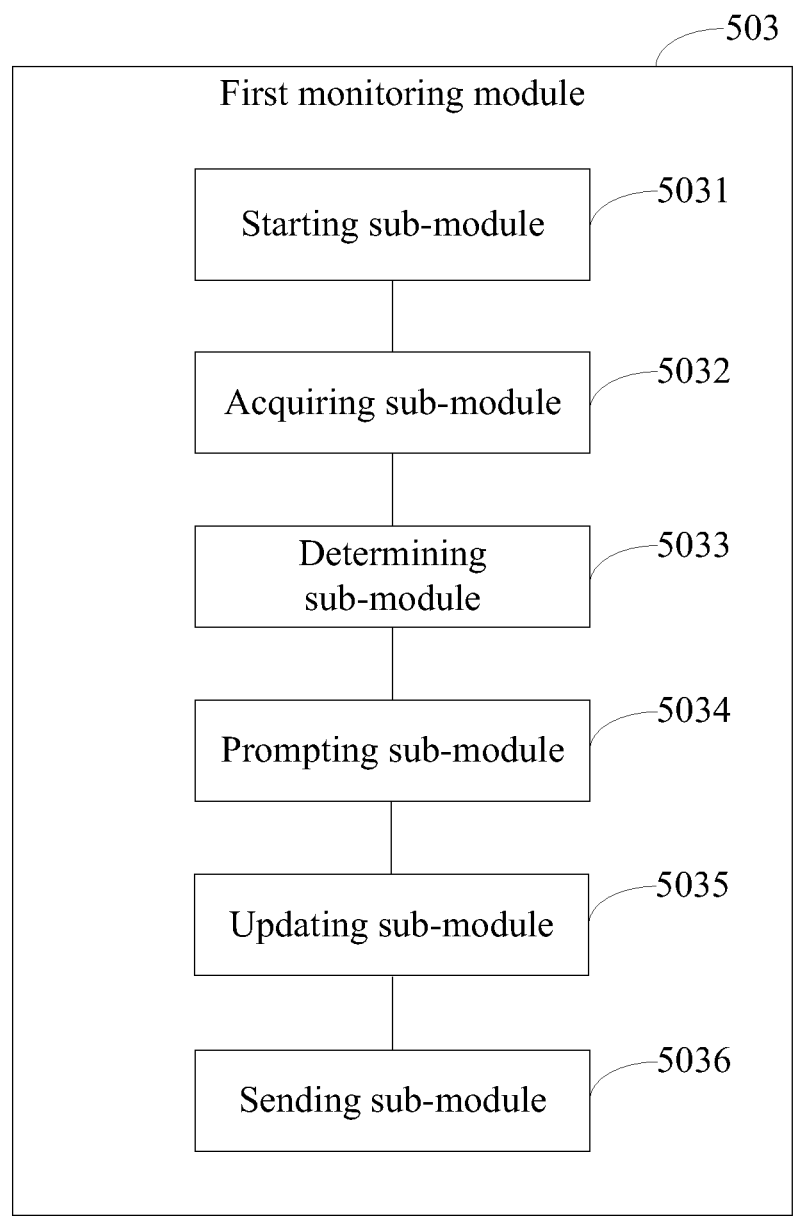
FIG. 14 is a block diagram of a file transferring system included in an electronic device provided in embodiment 6.

Referring to FIG. 14, the present embodiment provides the electronic device 110 including a file transferring system 600. Compared to the file transferring system 500 of the embodiment 5, the first monitoring module 503 further includes a starting sub-module 5031, an acquiring sub-module 5032, a determining sub-module 5033, a prompting sub-module 5034, an updating sub-module 5035, and a sending sub-module 5036.

Figure 15:
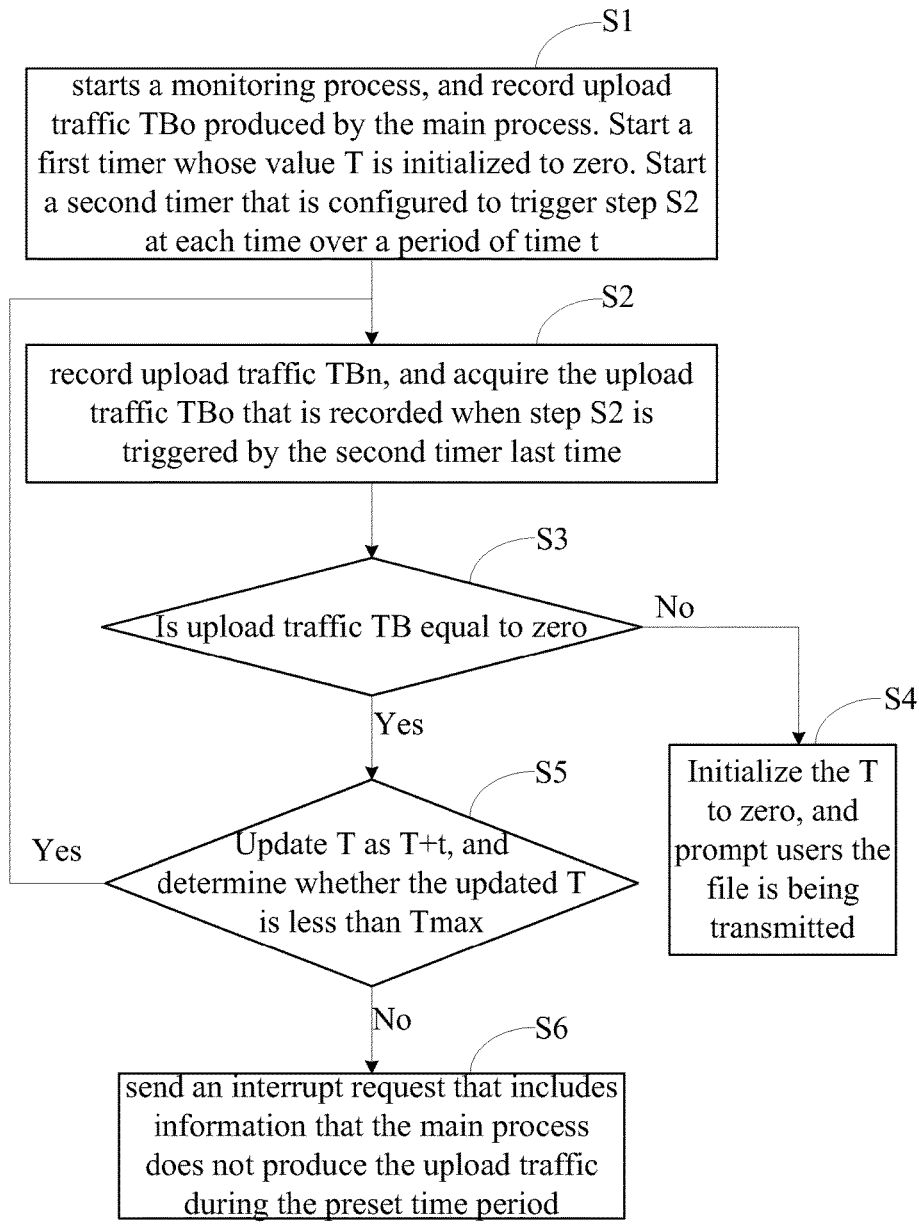
FIG. 15 is a flowchart of a file transferring method for in accordance with embodiment 6.

Referring to FIG. 15, the present embodiment further provides a method for transferring the file from the electronic device 110 to the target device 120. Compared to the method provided by the embodiment 5, the step S303 includes following steps:

Step S1: the starting sub-module 5031 starts the monitoring process, and records upload traffic TBo produced by the main process. The starting sub-module 5031 further starts a first timer. A value T of the first timer is initialized to zero. The first timer is configured for timing a duration during which the main process does not produce the upload traffic. The starting sub-module 5031 further starts a second timer that is configured to trigger the acquiring sub-module 5032 at each time over a time period t.

Step S2: the acquiring sub-module 5032 records upload traffic TBn produced by the main process when the acquiring sub-module 5032 is triggered by the second timer, and acquires the upload traffic TBo produced by the main process that is recorded when the acquiring sub-module 5032 is triggered by the second timer last time. If it is the first time the acquiring sub-module 5032 is triggered by the second timer, the acquiring sub-module 5032 acquires the upload traffic TBo produced by the main process that is recorded when the monitoring process is started.

Step S3: the determining sub-module 5033 determines whether upload traffic TB is equal to zero. The upload traffic TB is produced by the main process during the time period t before the acquiring sub-module 5032 is triggered by the second timer. The TB is the difference between the TBn and TBo. If the TB is not equal to zero, a step S4 is executed. If the TB is equal to zero, a step S5 is executed. Step S4: the prompting sub-module 5034 initializes the value T of the first timer to zero, and prompts users the file is being transferred. If the TB is not equal to zero, the main process produces upload traffic during the time period t before this time the acquiring sub-module 5032 is triggered by the second timer and the file is being transferred. In that case, the value T of the first timer should be initialized to zero, so that the first timer would retime the duration during which the main process does not produce the upload traffic.

Step S5: the updating sub-module 5035 updates the value T of the first timer as T+t, and determines whether the updated T is less than a predefined upper limit $T_{max}$. The upper limit $T_{max}$ is defined as integral multiple of the time period t. If T is less than the $T_{max}$, back to the step S2. If T is not less than the $T_{max}$, a step S6 is executed.

Step S6: the sending sub-module 5036 sends out the interrupt request. The interrupt request includes information that the main process does not produce the upload traffic during the preset time period. The preset time period is a past time period from current time to the predefined upper limit, such five seconds.

The above method can determine whether the main process produces upload traffic during the preset time period via periodically monitoring the upload traffic produced by the main process.

Although certain embodiments of the present disclosure have been specifically described, the present disclosure is not to be constructed as being limited thereto. Various changes or modifications may be made to the present disclosure without departing from the scope and spirit of the present disclosure.

What is claimed is:

1. An electronic device, comprising:
   a storage system;
   at least one processor;
   one or more programs stored in the storage system and executed by the at least one processor, the one or more programs comprising:
      a submitting module that submits a file segment to be transferred toward a target device into a transferring queue in a main process of the electronic device;
      a delay module that waits for an interrupt request from a first monitoring module in the electronic device;

the first monitoring module that creates and executes a monitoring process that is different from the main process, wherein the monitoring process monitors the upload traffic produced by the main process periodically, and determines whether the main process produces the upload traffic during a preset time period;

in response to determining that the main process has not produced any upload traffic during the preset time period, the first monitoring module sending out the interrupt request to the delay module in the electronic device which comprises information that the main process has not produced any upload traffic during the preset time period;

a second monitoring module that monitors a response from the target device; and triggers the delay module to stop waiting for the interrupt request when a response from the target device is received.

2. The electronic device of claim 1, wherein the second monitoring module further determines that transferring of the file segment is failed when the interrupt request is received.

3. The electronic device of claim 1, wherein execution of the first monitoring module ends after the first monitoring module sends out the interrupt request.

4. The electronic device of claim 1, wherein if the response from the target device is received, the second monitoring module further determines whether the file segment is received by the target device according to the response; if the file segment is not received by the target device, the second monitoring module determining that transferring of the file segment is failed.

5. The electronic device of claim 1, wherein the second monitoring module triggers the first monitoring module to stop the monitoring process when the response from the target device is received.

6. The electronic device of claim 1, wherein in response to receiving the interrupt request, the delay module suspends the transferring of the file segment for a delay time period according to a number of retrying times of transferring the file segment.

7. The electronic device of claim 1, wherein the first monitoring module further prompts users that the file is being transferred if the main process produces the upload traffic during the preset time period.

8. The electronic device of claim 1, further comprising:
a third monitoring module that monitors whether a communication network that connects between the electronic device and the target device is disconnected;
if the communication network is failed, the third monitoring module triggering the delay module to stop waiting for the interrupt request, triggering the first monitoring module to stop monitoring whether the main process produces upload traffic during the preset time period, and determining that the transferring of the file segment is failed.

9. The electronic device of claim 6, wherein the delay time period is calculated based on an exponential function of the number of retrying times of transferring the file segment.

10. A method for transferring a file, the method comprising:
step (a): submitting a file segment to be transferred toward a target device into a transferring queue in a main process of the electronic device;

step (b): waiting for an interrupt request from a monitoring process, wherein the monitoring process is executed on the electronic device and is different from the main process;

step (c): monitoring, by the monitoring process, the upload traffic produced by the main process periodically; determining whether the main process produces the upload traffic during a preset time period; and in response to determining that the main process has not produced any upload traffic during the preset time period, sending out the interrupt request which comprises information that the main process has not produced any upload traffic during the preset time period;

step (d): ending the step (b) when a response from the target device is received.

11. The method of claim 10, wherein the step (d) further comprises:
determining that transferring of the file segment is failed when the interrupt request is received.

12. The method of claim 10, wherein the step (c) ends after the interrupt request is sent out.

13. The method of claim 10, wherein the step (d) further comprises:
if the response from the target device is received, determining whether the file segment is received by the target device according to the response;
if the file segment is not received by the target device, determining that transferring of the file segment is failed.

14. The method of claim 10, wherein the step (d) further comprises:
ending the step (c) when the response from the target device is received.

15. The method of claim 10, wherein the step (c) further comprises:
prompting users that the file is being transferring if the main process produces the upload traffic during the preset time period.

16. The method of claim 10, further comprising:
monitoring whether a communication network that connects to the electronic device and the target device is disconnected after the step (b);
if the communication network is disconnected, ending the step (b) and step (c), and determining that the transferring of the file segment is failed.

17. A non-transitory storage medium storing a set of instructions, the set of instructions capable of being executed by a processor of an electronic device, cause the electronic device to execute a method for transferring a file, the method comprising:
step (a): submitting a file segment to be transferred toward a target device into a transferring queue in a main process of the electronic device;

step (b): waiting for an interrupt request from a monitoring process, wherein the monitoring process is executed on the electronic device and is different from the main process;

step (c): monitoring, by the monitoring process, the upload traffic produced by the main process periodically; determining whether the main process produces the upload traffic during a preset time period; and in response to determining that the main process has not produced any upload traffic during the preset time period, sending out the interrupt request which comprises information that the main process has not produced any upload traffic during the preset time period;

step (d): ending the step (b) when a response from the target device is received.

18. The storage medium of claim 17, wherein the step (d) further comprises:
   determining that transferring of the file segment is failed when the interrupt pending request is received.

19. The storage medium of claim 17, wherein the step (c) ends after the interrupt request is sent out.

20. The storage medium of claim 17, wherein the step (d) further comprises:
   if the response from the target device is received, determining whether the file segment is received by the target device according to the response;
   if the file segment is not received by the target device, determining that transferring of the file segment is failed.

21. The electronic device of claim 9, wherein the delay time period is a product of a reference time and the exponential function of the number of retrying times of transferring the file segment.

* * * * *